US010005223B2

(12) United States Patent
Takehana et al.

(10) Patent No.: US 10,005,223 B2
(45) Date of Patent: *Jun. 26, 2018

(54) BLOW MOLD UNIT, BLOW MOLDING MACHINE AND BLOW MOLD UNIT FIXING METHOD

(71) Applicant: NISSEI ASB MACHINE CO., LTD., Nagano (JP)

(72) Inventors: Daizaburo Takehana, Nagano (JP); Kazuyuki Yokobayashi, Nagano (JP); Fumiyuki Nakazawa, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 262 days.

This patent is subject to a terminal disclaimer.

(21) Appl. No.: 14/985,958

(22) Filed: Dec. 31, 2015

(65) Prior Publication Data

US 2016/0167282 A1  Jun. 16, 2016

Related U.S. Application Data

(63) Continuation of application No. 14/421,702, filed as application No. PCT/JP2013/071626 on Aug. 9, 2013, now Pat. No. 9,440,392.

(30) Foreign Application Priority Data

Aug. 17, 2012  (JP) .................................. 2012-181033

(51) Int. Cl.
    *B29C 49/48*    (2006.01)
    *B29C 49/56*    (2006.01)
    (Continued)

(52) U.S. Cl.
CPC .............. *B29C 49/56* (2013.01); *B29C 49/28* (2013.01); *B29C 49/48* (2013.01); *B29C 49/06* (2013.01);
(Continued)

(58) Field of Classification Search
CPC .... B29C 2049/4864; B29C 2049/4869; B29C 2049/4889; B29C 2049/4892;
(Continued)

(56) References Cited

U.S. PATENT DOCUMENTS 5,496,166 A    3/1996   Vogel
7,381,045 B2   6/2008   Fields et al.
(Continued)

FOREIGN PATENT DOCUMENTS

CN        1590074 A    3/2005
CN        2767132 Y    3/2006
(Continued)

OTHER PUBLICATIONS

International Search Report dated Nov. 26, 2013 for Application No. PCT/JP2013/071626 (4 pages).
(Continued)

*Primary Examiner* — Robert B Davis
(74) *Attorney, Agent, or Firm* — David L. Hoffman; Hoffman Patent Group

(57) ABSTRACT

A blow mold unit in which, when clamping first and second blow cavity split molds which are fixed to first and second fixing plates and bottom molds which are fixed to a bottom mold fixing plate, pressure receiving members fixed to the first and second fixing plates are brought into engagement with the bottom plate fixing plate. Guide plates are fixed to the bottom mold fixing plate, and guided members capable of being brought into abutment with the guide plates are supported by first and second pressure receiving plates. The bottom mold fixing plate includes a first connecting portion to be connected to a bottom mold opening/closing unit and a second connecting portion to be connected to a moving and biasing member.

5 Claims, 9 Drawing Sheets

(51) Int. Cl.
*B29C 49/28* (2006.01)
*B29C 49/06* (2006.01)

(52) U.S. Cl.
CPC ............... *B29C 2049/4864* (2013.01); *B29C 2049/4869* (2013.01); *B29C 2049/4889* (2013.01); *B29C 2049/4892* (2013.01); *B29C 2049/563* (2013.01); *B29C 2049/566* (2013.01); *Y10T 29/49897* (2015.01)

(58) Field of Classification Search
CPC ......... B29C 2049/563; B29C 2049/566; Y10T 29/49897
See application file for complete search history.

(56) References Cited

U.S. PATENT DOCUMENTS

| | | | |
|---|---|---|---|
| 8,944,806 | B2 | 2/2015 | Yokobayashi et al. |
| 9,440,392 | B2 * | 9/2016 | Takehana ................ B29C 49/48 |
| 2005/0058741 | A1 | 3/2005 | Fujii et al. |
| 2008/0260884 | A1 | 10/2008 | Dannebey et al. |
| 2011/0129558 | A1 | 6/2011 | Langlois |
| 2012/0294974 | A1 | 11/2012 | Yokobayashi et al. |
| 2014/0291877 | A1 | 10/2014 | Takahashi |

FOREIGN PATENT DOCUMENTS

| | | |
|---|---|---|
| CN | 201520056 U | 7/2010 |
| CN | 102431154 | 5/2012 |
| JP | 06344428 A | 12/1994 |
| JP | 08230027 | 9/1996 |
| JP | 2003231170 | 8/2003 |
| JP | 2008534323 | 8/2008 |
| JP | 2009126129 | 6/2009 |
| JP | 2011156728 | 8/2011 |
| WO | 2006103344 | 10/2006 |

OTHER PUBLICATIONS

Chinese Office Action, Application No. 2013800435261, dated Dec. 24, 2015 (12 Pages).
Taiwanese Office Action dated Jul. 24, 2015, Patent Application No. 102129467 (6 Pages).

* cited by examiner

FIG.5
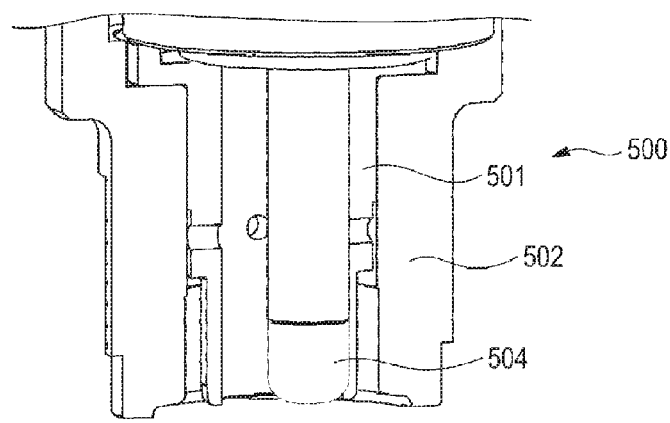
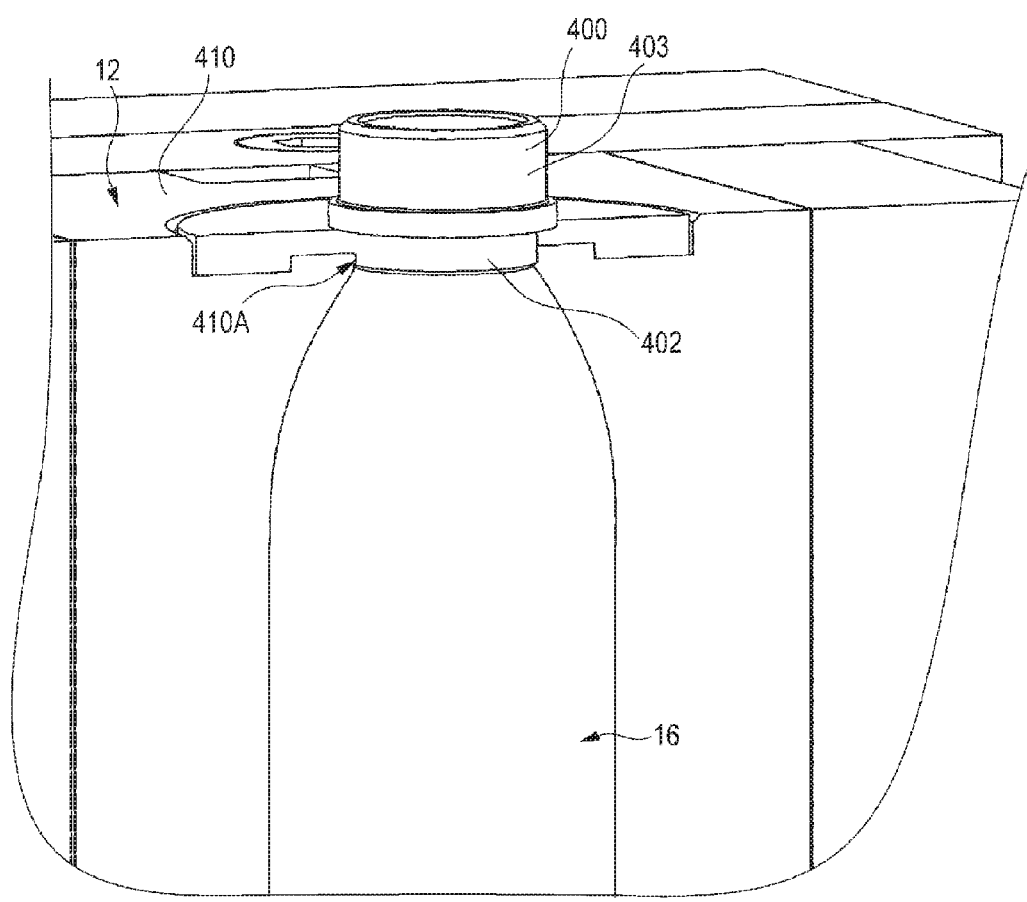

BLOW MOLD UNIT, BLOW MOLDING MACHINE AND BLOW MOLD UNIT FIXING METHOD

This application is a continuation of U.S. patent application Ser. No. 14/421,702, filed Feb. 13, 2015, which is a U.S. national stage application of International Patent Application No. PCT/JP2013/071626, having an international filing date of Aug. 9, 2013, which designated the United States and which claims priority from Japanese Patent Application No. 2012-181033, filed on Aug. 9, 2012, the entirety of each of which are incorporated herein by reference.

TECHNICAL FIELD

The present invention relates to a blow mold unit, a blow molding machine and a blow mold unit fixing method.

BACKGROUND ART

In a blow molding machine, when molding a container with self-supporting legs or a container with a raised bottom, a bottom mold is assembled to a bottom portion of a blow cavity mold, the bottom mold is closed by a driving device such as a hydraulic cylinder, and a bottom shape such as the self-supporting legs or the raised bottom is formed at a bottom portion of the container.

In a blow molding process in which the blow cavity mold and the bottom mold are clamped together and blow air is introduced into an interior of a preform, a pressure receiving member which is fixed to the blow cavity mold is brought into engagement with the bottom mold or a bottom mold fixing plate so as to prevent the retracting of the bottom mold caused by blow pressure (Patent Document 1).

Here, in order to clamp the bottom mold to the blow cavity mold, it is necessary to bring the bottom mold or the bottom mold fixing plate into engagement with the pressure receiving member at the mold closing position of the bottom mold. In case the bottom mold, which is in a closed state, is positioned only at a substantially upper limit or lower limit driving position of the driving device, the positioning accuracy of the bottom mold becomes less reliable when the pressure receiving member is brought into engagement with the bottom mold (the bottom mold fixing plate).

Accordingly, in Patent Document 1, a stopper member is provided to a bottom mold or a bottom mold fixing plate to which the bottom mold is attached so as to regulate the position of the bottom mold relative to a blow cavity mold. According to this construction, when the blow cavity mold, in which blow molding is executed in an inverted state where a neck portion of the preform is oriented, for example, downwards, is opened, the bottom mold is moved downwards to close the mold. The stopper member is a plate-shaped member which is wider in width than the bottom plate. Thereafter, when the blow cavity mold is closed, an upper end face of the blow cavity mold is brought into abutment with the stopper member to thereby regulate the position of the bottom mold relative to the blow cavity mold. This allows the bottom mold to be positioned in the closed state. Additionally, by adjusting the thickness or parallelism of the stopper member, the closing position of the bottom mold or a positional relationship between cavity surfaces of the blow cavity mold and cavity surfaces of the bottom mold can be adjusted.

It is preferable that the blow cavity mold and the bottom mold are driven to be opened or closed in synchronism with each other. For example, the blow cavity mold and the bottom mold can be driven in synchronism with each other based on the output of a motor which is a single driving source (Patent Document 2).

PRIOR ART DOCUMENTS

Patent Documents

Patent Document 1: JP-A-H08-230027
Patent Document 2: JP-A-2009-126129

SUMMARY OF THE INVENTION

Problem that the Invention is to Solve

According to the construction of Patent Document 1, when a pair of blow cavity split molds which configure the blow cavity mold are closed, the pair of blow cavity split molds are closed while upper end faces of the pair of blow cavity split molds are kept in contact with the stopper member which is fixed to the bottom mold side.

Here, the stopper member which is fixed to the bottom plate side is set to a length that enables the stopper member to be in abutment with the upper end faces of the pair of blow cavity split molds over the whole areas thereof with the blow cavity mold opened. Consequently, the stopper member is kept in contact with the upper end faces of the pair of blow cavity split molds at all times while the pair of blow cavity split molds are shifted from an open state to a closed state.

A nitriding treatment is performed to the stopper member to enhance the wear resistance. However, the wear of the stopper member with time cannot be avoided. In case galling (meshing) is generated in the sliding surface between the stopper member and the blow cavity mold, a problem is caused that the lives of the molds and the bottom mold driving members (the guide rod, the bearings and the like) are shortened.

Some aspects of the invention provide a blow mold unit and a blow molding machine which can stabilize a bottom mold clamping motion to thereby mitigate loads applied to a bottom mold driving mechanism and molds. Other aspects of the invention provide a blow mold unit fixing method for fixing a blow mold to a clamping table with good accuracy and quickly.

Means for Solving the Problem (1) An aspect of the invention is related to a blow mold unit including:

first and second blow cavity split molds to be clamped together by bringing their parting faces into abutment with each other;

a plurality of bottom molds defining a plurality of bottom shapes for a plurality of cavities which are defined by the first and second blow cavity split molds;

first pressure receiving plates respectively fixed to both side faces of the first blow cavity split mold, which are located at both ends in a first direction along a direction in which the plurality of cavities are aligned;

second pressure receiving plates respectively fixed to both side faces of the second blow cavity split mold and brought into abutment with the first pressure receiving plates when the first and second blow cavity split molds are clamped together;

a first fixing plate to which the first blow cavity split mold and the first pressure receiving plates are fixed;

a second fixing plate to which the second blow mold and the second pressure receiving plates are fixed;

a bottom mold fixing plate to which the plurality of bottom molds are fixed;

pressure receiving members respectively fixed to the first and second fixing plates and brought into engagement with the bottom mold fixing plate when the first and second blow cavity split molds are clamped together to receive a blowing pressure exerted on the bottom molds;

guide plates respectively fixed to the bottom mold fixing plate at both end portions in the first direction; and guided members respectively supported by the first and second pressure receiving plates at both end portions in the first direction and capable of being brought into abutment with the guide plates when the bottom molds are in a closed position, wherein the bottom mold fixing plate includes, a first connecting portion to be connected to a bottom mold opening/closing unit which is to be driven by a clamping mechanism provided to a blow molding machine; and a second connecting portion to be connected to a moving and biasing member which is provided to the blow molding machine and moves and biases the bottom mold fixing plate, which is in the closed position, in a direction in which the bottom molds are closed.

According to the aspect of the invention, since the pressure receiving members of the first and second blow cavity split molds which are clamped together are brought into engagement with the bottom mold fixing plate, it can be handled as a blow mold unit in which the first and second blow cavity split molds and the bottom molds are unitized. Moreover, since the first and second connecting portions which are provided to the bottom mold fixing plates are made into threaded holes or the like, there is no member which project from the bottom mold fixing plate. Consequently, the blow mold unit can be carried into the blow molding machine by causing the flat bottom mold fixing plate to slide over the blow molding machine.

Here, when the blow mold unit is mounted to the blow molding machine, the bottom mold fixing plate, which is connected to the bottom mold opening/closing unit via the first connecting portion, is driven by the bottom mold opening/closing unit which is driven by the clamping mechanism of the blow molding machine. Therefore, the bottom molds which are fixed to the bottom mold fixing plate are set to the closed position. The first and second blow cavity split molds are closed relative to the bottom molds which are in the closed position. At this time, in case there is a deviation in the closed position of the bottom molds which is set by the bottom mold opening/closing unit, the guided members are brought into abutment with the guide plates. The bottom molds are connected to the moving and biasing member which is provided on the blow molding machine via the second connecting portion and are moved and biased in the mold closing direction by the moving and biasing member. Therefore, the height position and inclination of the bottom molds are corrected by the pressure exerted by the guided members against the biasing force of the moving and biasing member. This enables the pressure receiving members, which are provided to the first and second blow cavity split molds, to be reliably brought into engagement with the bottom mold fixing plate.

At this time, since the guided members are not a stopper member like the stopper member disclosed in Patent Document 1, if the closed position of the bottom molds is correct, the guided members can be made not to be brought into contact with the guide plates. Additionally, even if the guided members are brought into contact with the guide plates, since the guide plates are permitted to move together with the bottom molds by the moving and biasing member, no excessive stress is applied to the guided members and the guide plates, whereby it is possible to prevent the occurrence of galling therein or wear thereof with time. The guided members are configured by, for example, rollers so that the guide members can be brought into rolling contact with the guide plates (can contact the guide plates so as to roll thereover) or made of slide metal, whereby a frictional force to be generated between the guide plates and themselves can be reduced.

(2) In the aspect of the invention, a length of the guide plate in a second direction along a direction in which the first and second blow cavity split molds are opened and closed may be formed in a length by which the guided members face the guide plates at least immediately before the pressure receiving members are brought into engagement with the bottom mold fixing plate.

In this way, the guided members and the guide plates can correct the position of the bottom molds at least immediately before the pressure receiving members are brought into engagement with the bottom mold fixing plates. This can eliminate a risk of the length of the guide plates being extended unnecessarily longer than required, thereby making it possible to prevent the generation of unwanted contact with the guided members.

(3) In the aspect of the invention, in the guide plate, corner portions, which are formed by an end face capable of being brought into abutment with the guided members and side faces intersecting the end face at the end portion at both end sides in the second direction, may be chamfered.

By adopting this configuration, frictional resistance can be reduced when the guided members ride on the end portions of the guide plates. Therefore, the wear of the guide plates with time can be reduced.

(4) In the aspect of the invention, the first and second fixing plates may respectively include: an inner fixing plate to which either of the first and second blow cavity split molds, and the pressure receiving member are fixed; an outer fixing plate to which the inner fixing plate is fixed and which is to be attached to a clamping board of the blow molding machine; and a first guide roller supported by the outer fixing plate to be brought into rolling contact with the inner fixing plate and guiding a movement of the inner fixing plate in the first direction before the inner fixing plate is fixed to the outer fixing plate.

In this case, in mounting the blow mold unit in the blow molding machine, for example, two outer fixing plates are attached to two clamping boards. Next, the inner fixing plates to which the first and second blow cavity split molds are fixed are moved on to the first guide rollers which are supported by the outer fixing plates, so that a positional adjustment is made in relation to the first direction in which the cavities are aligned. After the positional adjustment has been completed, the inner supporting plates can be fixed to the outer fixing plates. The order in which the inner fixing plates are fixed to the outer fixing plates may be opposite to the order described above.

(5) in the aspect of the invention, the blow mold unit may further comprise, between the outer fixing plate which is fixed to the first blow cavity split mold and the outer fixing plate which is fixed to the second blow cavity split mold, a movement guide member which guides movement of the first and second blow cavity split molds in the second direction along the direction in which the first and second blow cavity split molds are opened and closed.

Normally, a tie-bar which guides the movement of the first and second blow cavity split molds in the direction in which they are opened and closed is disposed outside the first and second blow cavity split molds. Since the movement guide member is disposed by making use of a space between the facing outer fixing plates, it is possible to save space.

(6) Another aspect of the invention is related to a blow molding machine including:

the blow mold unit according to any one of the above-described (1) to (3);

the clamping mechanism;

the bottom mold opening/closing unit connected to the first connecting portion of the blow mold unit and to be driven by the clamping mechanism; and the moving and biasing member connected to the second connecting portion of the blow mold unit and moving and biasing the bottom mold fixing plate, which is in the closed position, in a direction in which the bottom molds are closed.

According to the blow molding machine, the working effects described uncle to (3) can also be obtained.

(7) Another aspect of the invention is related to a blow molding machine including:

the blow mold unit according to the above-described (4) or (5);

the bottom mold opening/closing unit connected to the first connecting portion of the blow mold unit and to be driven by the clamping mechanism;

the moving and biasing member connected to the second connecting portion of the blow mold unit and moving and biasing the bottom molds, which are in the closed position, in a direction in which the bottom molds are closed;

the clamping board to which the outer fixing plates of the blow mold unit are fixed; and a second guide roller supported by the clamping board to be brought into rolling contact with the outer fixing plates and guiding a movement of the blow mold unit in the first direction before the outer fixing plates are fixed to the clamping board.

According to the blow molding machine, the working effects described under (1) to (3) can also be obtained. In addition, in installing the blow mold unit to the blow molding machine, the outer fixing plates are moved on the second guide rollers which are supported on the clamping boards so that a positional adjustment is performed in the first direction in which the cavities are aligned. After the positional adjustment is completed, the outer fixing plates can be fixed to the clamping boards.

(8) Another aspect of the invention is related to a blow mold unit fixing method including:

preparing a centering jig including a first centering portion which can be fitted in an opening portion of the cavity formed in the blow mold unit according to any one of claims 1 to 4 and a second centering portion which can be fitted in a gap formed around a circumference of an extending rod of a blow nozzle;

positioning the blow mold unit and the blow nozzle by using the centering jig; and fixing the blow mold unit which is positioned by using the centering jig to the clamping board of the clamping mechanism.

According to this method, the blow mold unit can be fixed to the clamping boards with good accuracy and quickly.

Advantage of the Invention

According to some aspects of the invention, it is possible to provide the blow mold unit and the blow molding machine which can stabilize the bottom mold clamping motion to thereby mitigate the loads to be applied to the bottom mold driving mechanism and the molds. According to other aspects of the invention, it is possible to fix the blow mold to the clamping table with good accuracy and quickly.

BRIEF DESCRIPTION OF DRAWINGS

FIG. 5 is a view showing a state in which a centering jig is accommodated in a blow mold.

MODE FOR CARRYING OUT THE INVENTION

Hereinafter, an embodiment of the invention will be described in detail by the use of the drawings. The following embodiment is not intended to unreasonably limit the contents of the invention which will be claimed later. Additionally, all configurations which will be described below are not necessarily essential constituent elements of the invention.

1. Blow Mold Unit 1.1. Basic Construction

Figure 1:
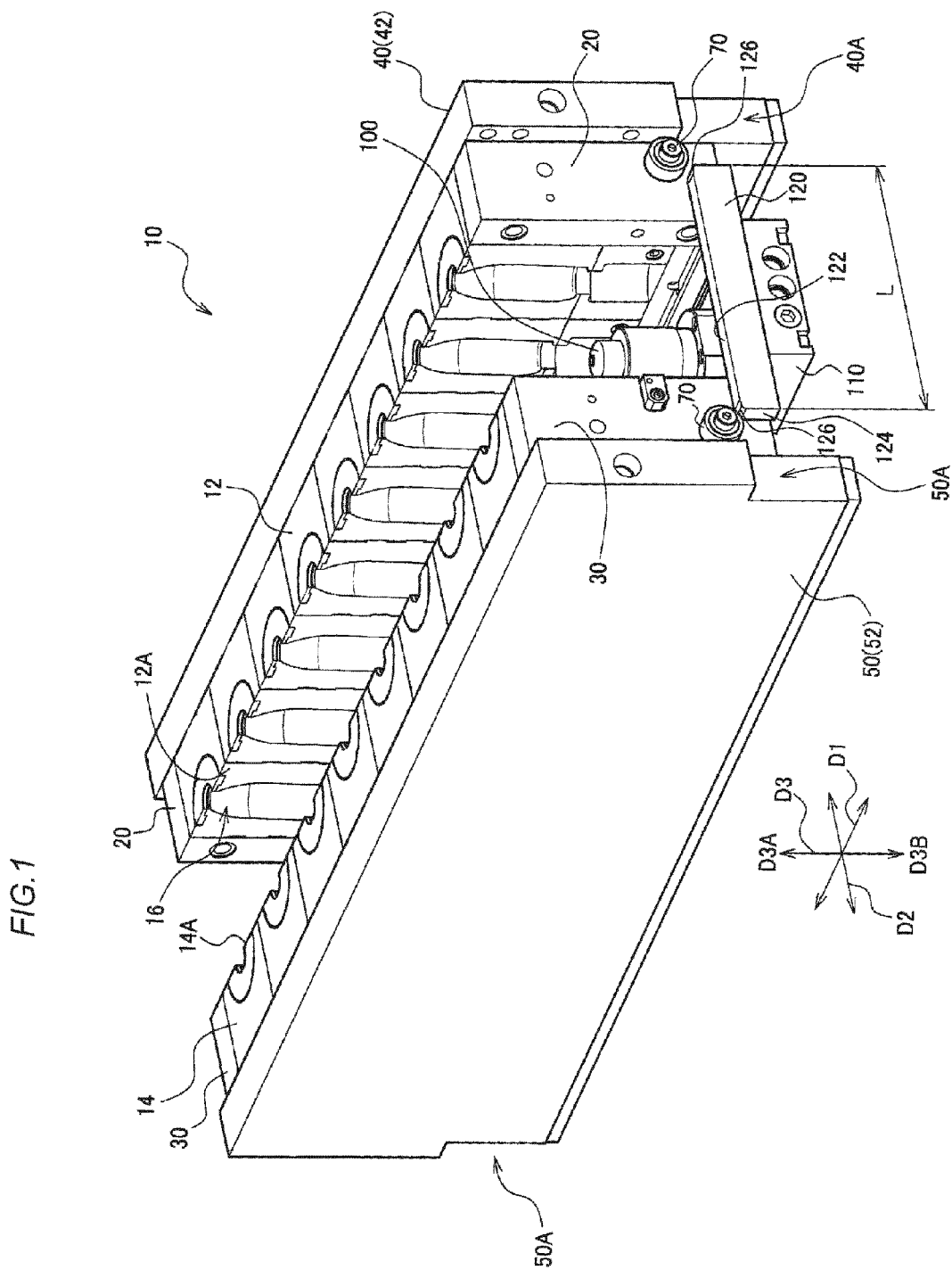
FIG. 1 is a perspective view showing a fully opened state of a blow mold unit according to an embodiment of the invention with a bottom mold closed when first and second blow cavity split molds are opened.
Figure 2:
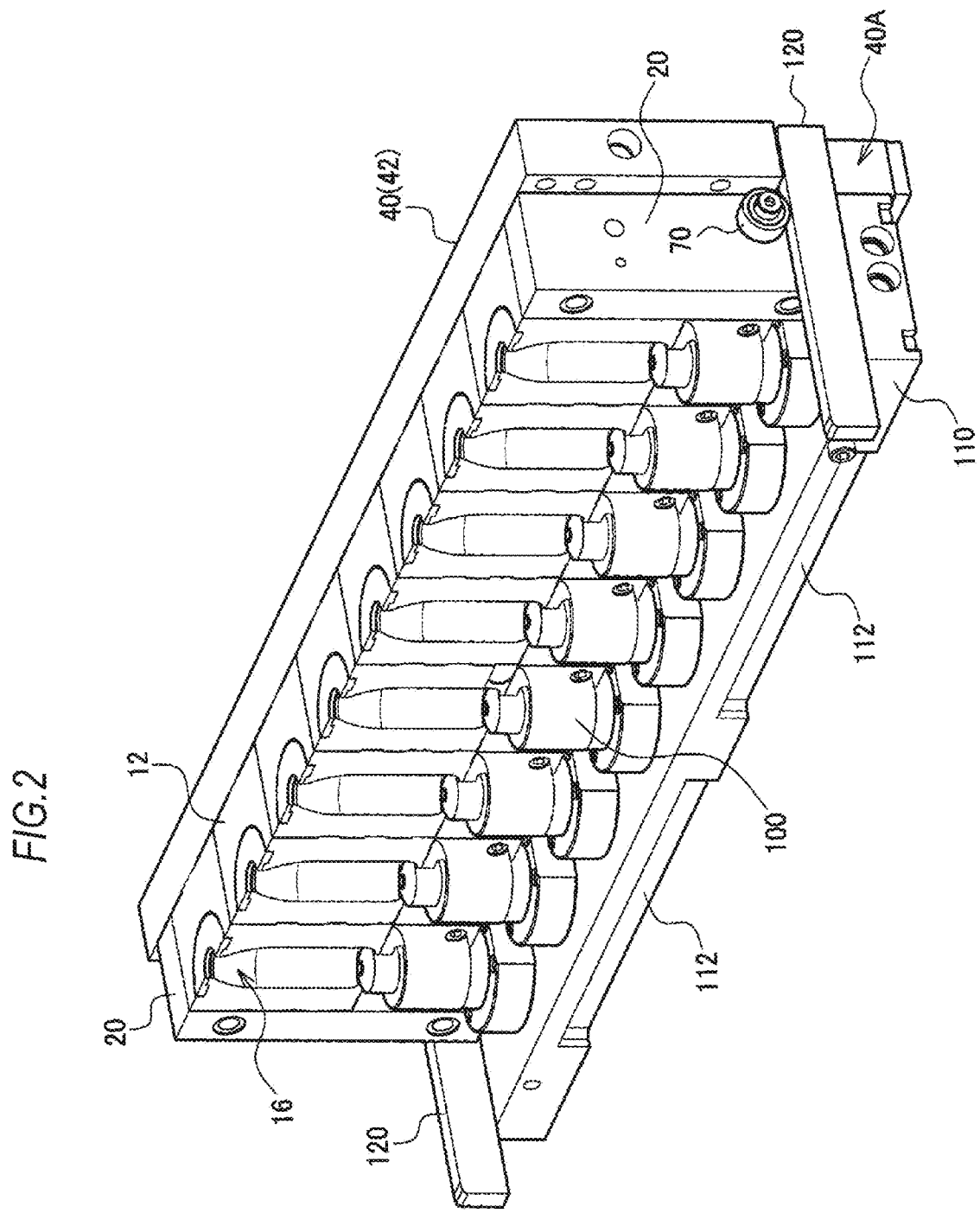
FIG. 2 is an exploded perspective view with the second blow cavity split mold and a second fixing plate removed from the blow mold unit.
Figure 3:
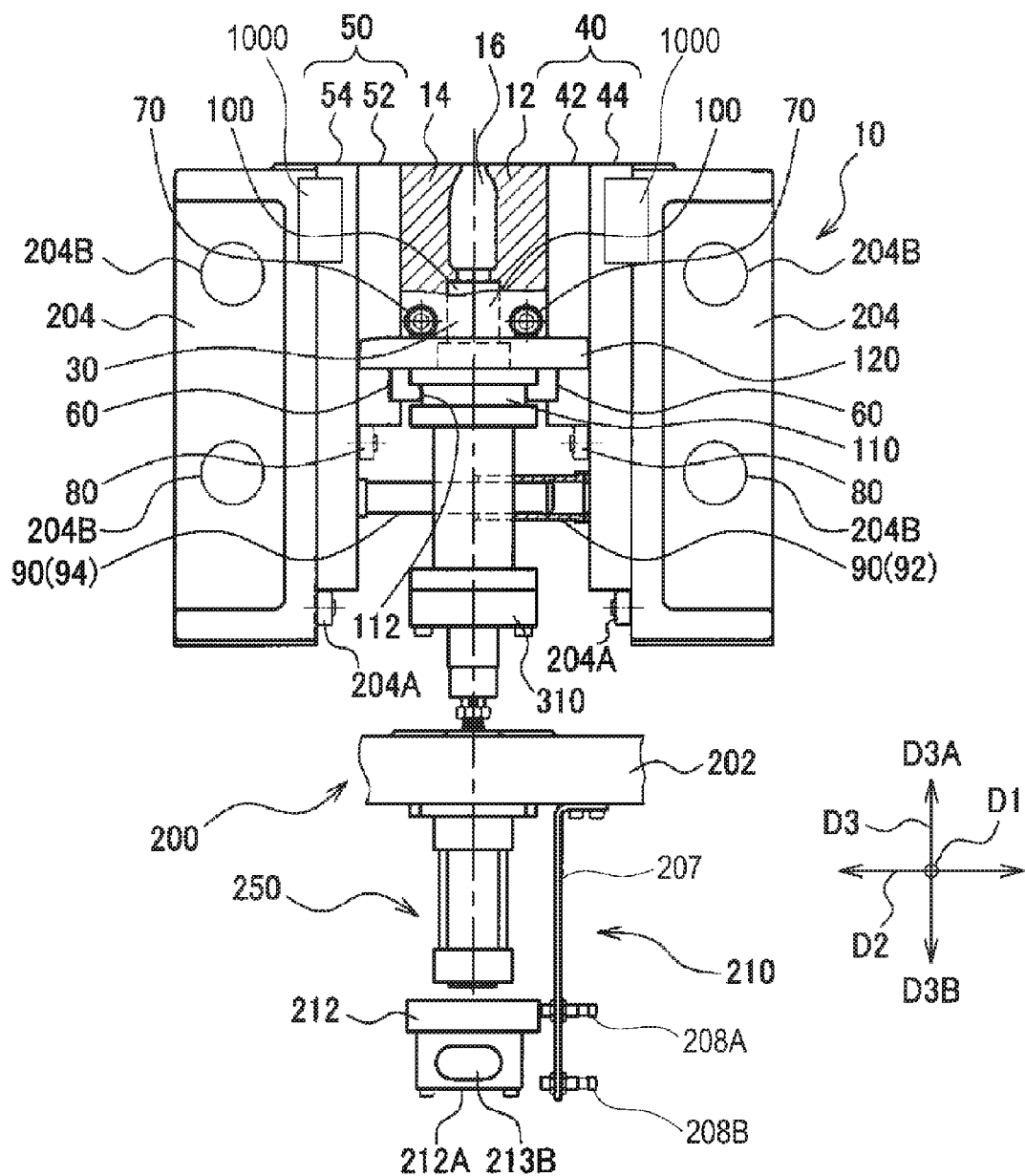
FIG. 3 is a side view showing a state in which the blow mold unit mounted on a blow molding machine is clamped.
Figure 4:
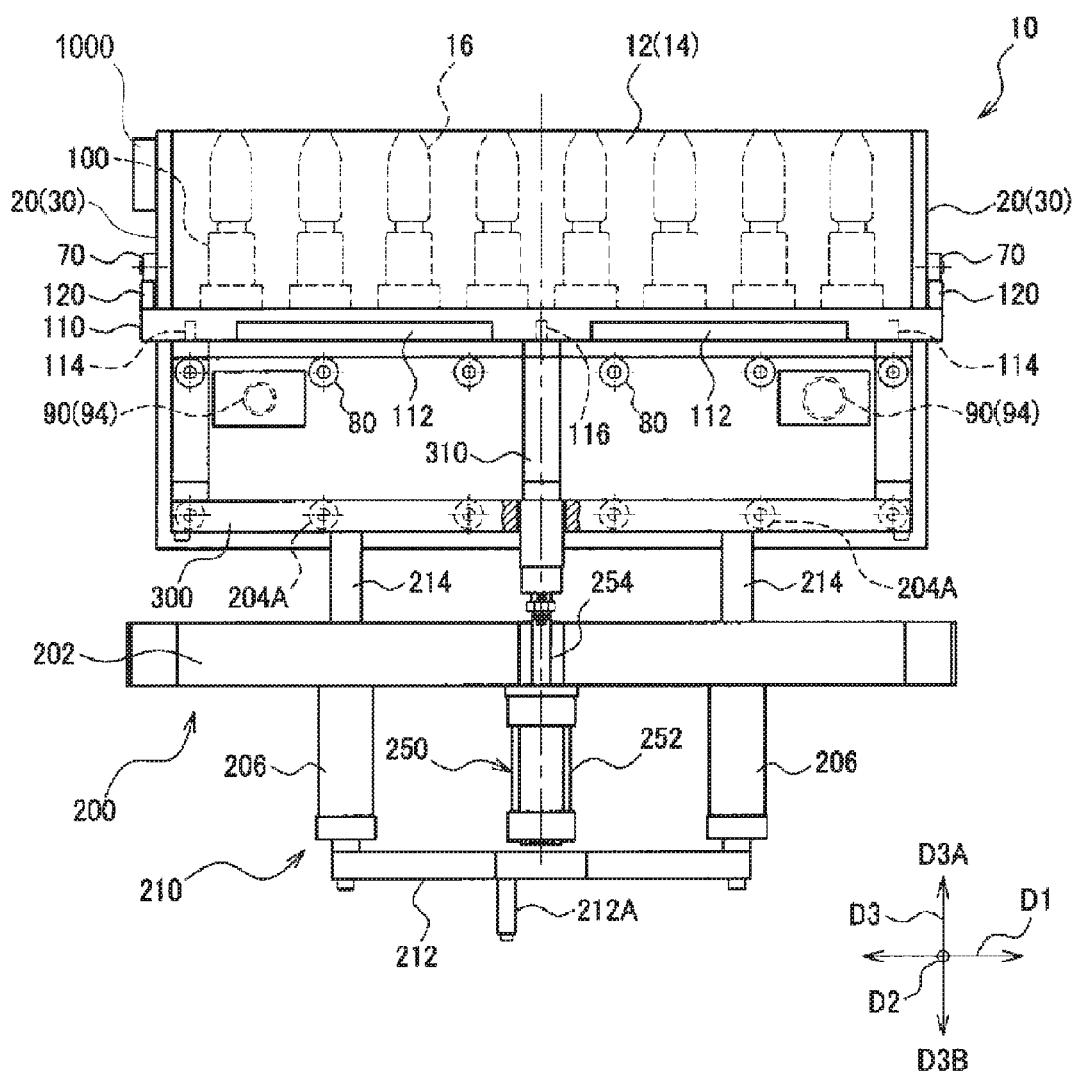
FIG. 4 is a front view of the blow mold unit mounted on the blow molding machine.

The configuration of a blow mold unit 10 will be described by reference to FIGS. 1 to 4. The blow mold unit 10 is shown as being fully opened in FIG. 1 and is shown as being clamped in FIGS. 2 and 3. FIGS. 1 and 2 show only the blow mold unit 10, while FIGS. 3 and 4 show the blow mold unit 10 as being mounted on a blow molding machine 200. Additionally, FIGS. 3 and 4 show an example in which small containers, which are short in a vertical direction of a clamping board 204 of the blow molding machine 200 (a direction D3), are blow molded. Due to this, attachments 300, 310 which are used exclusively in blow molding small containers are added.

The blow mold unit 10 includes first and second blow cavity split molds 12, 14 and a plurality of bottom molds 100. The first and second blow cavity split molds 12, 14 are clamped together with parting faces 12A, 14A brought into abutment with each other. The plurality of bottom molds 100 define a plurality of bottom shapes such as raised bottoms for a plurality of cavities 16 which are defined by the first and second blow cavity split molds 12, 14.

Here, in FIGS. 1 to 4, a direction in which the plurality of cavities 16 are aligned will be referred to as a first direction D1, a direction in which the first and second blow cavity split molds 12, 14 are opened and closed as a second direction D2, and a direction in which the bottom molds 100 are opened and closed as a third direction D3. The first to third directions D1 to D3 intersect each other at right angles. In the third direction D3, a direction in which the bottom molds 100 are closed will be referred to as D3A, and a direction in which the bottom molds 100 are opened as D3B, in this embodiment, the direction D3A is directed upwards, and the direction D3B is directed downwards. However, like in Patent Document 1, the first and second blow cavity split molds 12, 14 and the bottom molds 100 may be disposed so that the direction D3A is directed downwards and the direction D3B is directed upwards.

The blow mold unit 10 further has first pressure receiving plates 20 which are respectively fixed to both side faces of the first blow cavity split mold 12 which are located at both ends in the first direction D1 and second pressure receiving plates 30 which are respectively fixed to both side faces of the second blow cavity split mold 14. The first and second pressure receiving plates 20, 30 are brought into abutment with each other when the first and second blow cavity split molds 12, 14 are clamped together to receive a blowing pressure.

The blow mold unit 10 has further a first fixing plate 40 to which the first blow cavity split mold 12 and the first pressure receiving plates 20 are fixed, a second fixing plate 50 to which the second blow cavity split mold 14 and the second pressure receiving plates 30 are fixed, and a bottom mold fixing plate 110 to which the plurality of bottom molds 100 are fixed.

The first and second fixing plates 40, 50 each have a pressure receiving member 60 as shown in FIG. 3. The pressure receiving members 60 are brought into engagement with the bottom mold fixing plate 110 when the first and second blow cavity split molds 12, 14 are being closed to be clamped together with the bottom molds 100 located in a closed position as shown in FIG. 3. This allows the pressure receiving members 60 to receive the blowing pressure to the bottom molds 100.

1.2. Bottom Mold Positioning Construction

The bottom mold fixing plate 110 has, for example, grooves 112 (refer to FIGS. 2, 4) as engagement portions with which the pressure receiving members 60 are brought into engagement. As shown in FIG. 3, when the mold is closed, the pressure receiving members 60 are brought into engagement with the grooves 112 on the bottom mold fixing plate 110, whereby the bottom mold fixing plate 110 and the bottom molds 100 which are fixed thereto are prevented from retracting in the direction D3B even if they are subjected to the blowing pressure.

Consequently, it is necessary that the bottom molds 100 and the bottom mold fixing plate 110 are positioned so as to be set in the closed position so that the pressure receiving members 60 are brought into engagement with the grooves 112 when the first and second blow cavity split molds 12, 14 are closed.

The blow mold unit 10 has guide plates 120 which are respectively fixed to the bottom mold fixing plate 110 at both end portions of the bottom mold fixing plate 110 in the first direction M. The blow mold unit 10 has guided members, for example, guide rollers 70 which are respectively supported by the first and second pressure receiving plates 20, 30 at both end portions of the first and second pressure receiving plates 20, 30 in the first direction D1.

The guide rollers 70 can be brought into rolling contact with the guide plates 120 when the bottom molds 100 are in the closed position as shown in FIG. 1. However, when the first and second blow cavity split molds 12, 14 are fully opened as shown in FIG. 1, the guide rollers 70 may be positioned so as to be out of engagement with both end portions of the guide plates 120. Namely, a length L (FIG. 1) of the guide plate 120 in the second direction D2 along the direction in which the first and second blow cavity split molds 12, 14 are opened and closed can be formed into a length that the guide rollers 70 and the end portions of the guide plate 120 do not face each other when the first and second blow cavity split molds 12, 14 are fully opened, while the rollers 70 and the end portions of the guide plate 120 come to face each other immediately before the pressure receiving members 60 are brought into engagement with the grooves 112 on the bottom mold fixing plate 110. As shown in FIG. 1, cutout portions 40A, 50A can be provided to the first and second fixing plates 40, 50, respectively, so that the first and second fixing plates 40, 50 do not interfere with the guide plate 120 when the first and second blow cavity split molds 12, 14 are closed.

As shown in FIG. 1, in the guide plate 120, corner portions, which are formed by a end face 122 capable of being brought into abutment with the guide rollers 70 and side faces 124 intersecting the end face 122 at the end portion at both end sides in the second direction D2, can be made into chamfered portions 126. The corner portions can be made into inclined surfaces or curved surfaces by the chamfered portions 126.

By adopting this construction, frictional resistance when the guide rollers 70 ride on to the end portions of the guide plate 120 can be reduced by the chamfered portions 126. Therefore, the wear of the guide plate 120 with time can be prevented. However, the guided members are not limited to the rollers 70 and hence may be formed of a member with reduced frictional resistance such as sliding metal or the like.

Here, the contact between the guide rollers 70 and the guide plate 120 pushes down the bottom molds 100 and the bottom mold fixing plate 110, which then reliably brings the pressure receiving members 60 into engagement with the grooves 112 of the bottom mold fixing plate 110.

At this time, before the pressure members 60 are brought into engagement with the grooves 112, the bottom molds 100 and the bottom mold fixing plate 110 are not positioned in the closed position rigidly but are allowed to move in the third direction D3.

To realize this, first connecting portions 114 and a second connecting portion 116 are provided to the bottom mold fixing plate 110 as shown in FIG. 4. The first and second connecting portions 114, 116 are threaded holes provided to a lower surface of the bottom mold fixing plate 110.

1.3. Connection of Blow Mold Unit with Blow Molding Machine

As shown in FIGS. 3 and 4, the blow molding machine 200 has a bottom mold opening/closing unit 210 which is driven by a clamping mechanism (not shown). The bottom mold opening/closing unit 210 has a lifting board 212 and a plurality of shaft portion 214 which extend upwards with their lower ends connected to the lifting board 212. The plurality of shaft portions 214 are guided to ascend and descend by ascending/descending guide portions 206 which are fixed to a lower base table 202 provided on a machine base (not shown) of the blow molding machine 200. A connecting portion 212A which is connected to a clamping mechanism (not shown) is provided to the lifting board 212 as shown in FIG. 3. An output shaft or an end portion of an output link of the clamping mechanism (not shown) is connected to a hole 213B provided to the connecting portion 212A. As shown in FIG. 3, an upper limit sensor 208A and a lower limit sensor 208B are fixed to an arm 207 which is suspended from the lower base table 202. FIG. 3 shows a state in which the lifting board 212 is set to an upper limit position where the lifting board 212 is detected by the upper limit sensor 208A. At this time, the bottom molds 100 are set to the closed position. After blow molding is completed, the lifting board 212 is driven to descend, and the bottom molds 100 are opened. The opening of the blow molds 100 is detected by the lower limit sensor 208B. These upper limit and lower limit sensors 208A, 208B can be used for a sequential control of blow molding operations and a synchronous driving control of the first and second blow cavity split molds 12, 14 and the bottom molds 100.

Although the plurality of shaft portions 214 of the bottom mold opening/closing unit 210 can be fixed directly to the first connecting portions 114 of the bottom mold fixing plate 110, in this embodiment, the plurality of shaft portions 214 are connected to the first connecting portions 114 of the bottom mold fixing plate 110 via a first spacer member 300. The first spacer member 300 is connected to the first connecting portions 114 of the bottom mold fixing plate 110 and the plurality of shaft portions 214 of the bottom mold opening/closing unit 210 by bolts (not shown). The first spacer member 300 is used because a distance between the bottom molds 100, which are used to blow mold the small containers, and the lower base table 202 becomes long as shown in FIG. 4. This construction allows the bottom mold fixing plate 110 and the bottom molds 100 fixed thereto to be moved to be opened or closed.

The second connecting portion 116 is connected to a movable biasing member, for example, an air cylinder 250, which moves and biases the bottom molds 100 which are in the closed position in the mold closing direction D3A. However, when the small containers are blow molded as shown in FIGS. 3 and 4, a second spacer member 310 is interposed between the air cylinder 250 and the bottom mold fixing plate 110. In this embodiment, as shown in FIG. 4, the air cylinder 250 has a cylinder 252 which is fixed to the lower base table 202 provided to the machine base (not shown) of the blow molding machine 200 and a rod 254 which is biased to project in the mold closing direction D3A by air which is compressed fluid inside the cylinder 252.

Due to this construction, the bottom molds 100 and the bottom mold fixing plate 110 are caused to ascend to the closed position by the bottom mold opening/closing unit 210, and at the upper limit positions (the closed position), are permitted to move by the rod 254 which is biased to project by the cylinder 252.

The clamping boards 204 of the blow molding machine 200 shown in FIG. 3 are connected to the clamping mechanism (not shown) via holes 204B. For example, a clamping mechanism like the one disclosed in Patent Document 2 can be used in which the first and second blow cavity split molds 12, 14 and the bottom molds 100 are driven synchronously based on the output of a motor which is a single drive source. At this time, links of a toggle mechanism are connected to the holes 204B of the clamping boards 204, and the toggle mechanism is connected to a synchronous clamping mechanism (for example, a piston-crank mechanism) which is driven by a motor. The hole 2129 formed in the connecting portion 212A of the bottom mold opening/closing unit 210 is connected to the synchronous clamping mechanism which is driven by the motor. An air cylinder, which is provided to the synchronous clamping mechanism of Patent Document 2, maintains the bottom molds 100 in the closed position while the piston-crank mechanism which is the synchronous clamping mechanism is driven to its top dead center where the bottom molds 100 reach the closed position and is thereafter kept driven beyond the top dead center. Therefore, the air cylinder 250 shown in FIGS. 3 and 4 has a different application from that of the air cylinder in Patent Document 2. Further, being different from the air cylinder of Patent Document 2, the air cylinder 250 is fixed above the base table 202. Therefore, only the bottom molds 100 can be caused to ascend or descend along without opening or closing the molds. This is preferable when replacing only the bottom molds 100 or when adjusting the position of the bottom molds 100 with high accuracy. In case the synchronous clamping mechanism of Patent Document 2 is used in this embodiment, the air cylinder 250 shown in FIGS. 3 and 4 can also be used as the air cylinder of Patent Document 1.

Further, the clamping mechanism is not limited to using the clamping mechanism of Patent Document 2. For example, a configuration may be adopted in which a clamping mechanism for the first and second blow cavity split molds 12, 14 and a clamping mechanism for the bottom molds 100 are separated, and the two clamping mechanisms may be driven in a synchronous fashion by a sequential control.

1.4. Additional Construction for Blow Mold Unit for Molding Small Containers

In the blow mold unit 10 shown in FIGS. 3 and 4 for blow molding small containers, the first fixing plate 40 can be divided into an inner fixing plate 42 to which the first blow cavity split mold 12 and the pressure receiving member 60 are fixed and an outer fixing plate 44 which connects the inner fixing plate 42 to the clamping board 204 of the blow molding machine 200. Similarly, the second fixing plate 50 can also be divided into an inner fixing plate 52 and an outer fixing plate 54. At this time, the first fixing plate 40 shown in FIG. 1 corresponds to the inner fixing plate 42 shown in FIG. 3, and the second fixing plate 50 shown in FIG. 1 corresponds to the inner fixing plate 52.

At this time, first guide rollers 80, which are supported on the outer fixing plates 44, 54 so as to be brought into rolling contact with lower end faces of the inner fixing plates 42, 52, can be further provided. The first guide rollers 80 can guide the movement of the inner fixing plates 42, 52 in the first direction D1 before the inner fixing plates 42, 52 are fixed to the outer fixing plates 44, 54.

In mounting the blow mold unit 10 on the blow molding machine 200, firstly, the two outer fixing plates 42, 52 are attached to the two clamping boards 204. Next, the inner fixing plates 42, 52 to which the first and second blow cavity split molds 12, 14 are fixed are moved on the guide rollers 80 which are supported by the outer fixing plates 44, 54 so as to be adjusted in position in the first direction D1 which is the direction in which the cavities 16 are aligned. After their positions are adjusted, the inner fixing plates 42, 52 can be fixed to the outer fixing plates 44, 54. The inner fixing plates 42, 52 and the outer fixing plates 44, 54 may be fixed in an opposite order as the order described above.

Second guide rollers 204A can be provided on the clamping boards 204 of the blow molding machine 200, and the second guide rollers 204A are brought into rolling contacts with lower end faces of the outer fixing plates 44, 54. The second guide rollers 204A guide the movement of the outer fixing plates 44, 54 in the first direction D1 of the blow mold unit 10 so as to adjust the positions before the outer fixing plates 44, 54 are fixed to the clamping boards 204. After being adjusted in position, the outer fixing plates 44, 54 can be fixed to the clamping boards 204.

In the blow mold unit 10 shown in FIGS. 3 and 4 which blow molds the small containers, movement guide members 90 which guides the movement of the first and second blow cavity split molds 12, 14 in the second direction D2, can be provided between the outer fixing plates 44, 54. The movement guide member 90 is configured by, for example, a tubular portion 92 which is fixed to the outer fixing plate 44 and a shaft portion 94 which is fixed to the outer fixing plate 54 and guided by the tubular portion 92. Normally, a tie-bar which guides the movement of the first and second blow cavity split molds 12, 14 in the direction D2 in which they are opened and closed is disposed outside the first and second blow cavity split molds 12, 14. Since the movement guide member 90 of this embodiment is disposed by making use of a space between the facing outer fixing plates 44, 54, it is possible to save space.

Incidentally, positioning members 1000 for positioning the blow mold unit 10 are provided to the clamping boards 204 at the machine side. However, it is difficult to execute a so-called centering level positioning, in which the blow mold unit 10 is positioned to such an extent that central positions of blow nozzles coincide with central positions of the cavities, by the positioning members 1000 provided to the clamping boards 204 serving as moving mechanisms. By nature, it is desirable that these positioning members 1000 are placed on stationary locations (non-movable locations). However, the moving mechanisms like the ascending/descending guide portions 206 are also provided below the blow mold unit 10, and therefore, there are no stationary portions which are connected to the machine base. Accordingly, in case a sufficient positional accuracy cannot be obtained by these positioning members 1000, it was necessary for a worker to manually center the blow nozzles and the blow molds (the blow cavity split molds) by making use of a ruler or the like. By this method, since a lower portion of the blow mold unit 10 becomes easily out of position due to the rollers, it was not easy to fix the blow molds to the clamping boards 204 while being centered properly.

Figure 6:
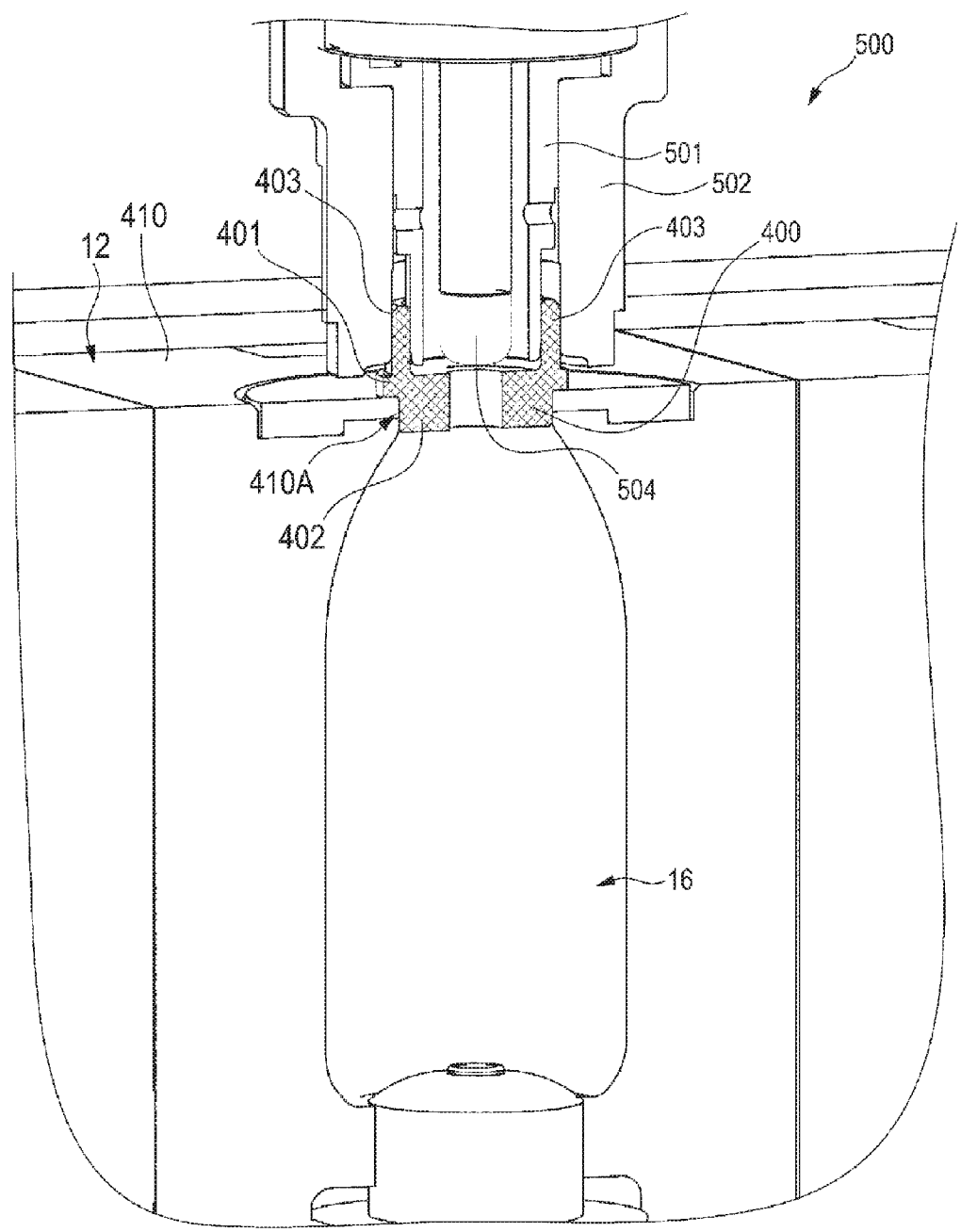
FIG. 6 is a view showing a state in which the centering jig is fitted in the blow mold and a blow nozzle.

In this embodiment, a centering jig 400 shown in FIGS. 5, 6 is adopted to perform the centering work described above automatically and simply. The centering jig 400 includes a flange portion 401 which is larger in diameter than an opening portion 410A which is formed to upper surfaces 410 of the first and second blow cavity split molds 12, 14 brought into abutment with each other, a first centering portion 402 whose diameter is substantially the same as that of the opening portion 410A and which can be accommodated inside the opening portion 410A, and a second centering portion 403 which can be accommodated in a gap defined between an inner nozzle 501 and an outer nozzle 502 of a blow nozzle 500, in order to reduce a risk of the blow nozzle 500 breaking when the blown nozzle 500 is brought into contact with the centering jig 400, an outer circumferential edge of a distal end of the second centering portion 403 is chamfered to be tapered inversely. For the same reason, it is preferable that an inner circumferential edge of the distal end of the second centering portion 403 is also tapered.

The centering jig 400 can be supported in the opening portion 410A by the flange portion 401. The first centering portion 402 may have any shape, provided that the first centering portion 402 can be fitted in the opening portion 410A of the cavity 16 with almost no gap therebetween. It is preferable that the second centering portion 403 has a shape where the second centering portion 403 can be fitted in the gap defined between the inner nozzle 501 and the outer nozzle 502 of the blow nozzle 500 with almost no gap left therebetween. Additionally, the second centering portion 403 may also have a shape which is fitted so as to cover an outer circumferential surface of an opening portion of the inner nozzle 501 near an end portion. As a modified example of the blow nozzle 500, a configuration may be adopted in which only the outer nozzle 502 is provided. In the case of this configuration being adopted, it is only necessary that the second centering portion 403 has a shape fitted to an inner circumferential surface of an opening portion of the outer nozzle 502 near a distal end portion thereof. As described above, it is only necessary that the second centering portion 403 has a shape fitted to a gap formed around a circumference of a distal end portion of an extending rod 504 of the blow nozzle 500.

Next, a positioning method using the centering jig 400 will be described.

1) The first blow cavity split mold 12, the second blow cavity split mold 14 and the bottom molds 100 are fixed together by a fixing jig into a single unit (hereinafter, the single unit will also be referred to as a blow mold).

2) The clamping boards 204 are opened, and the blow nozzles 500 are disposed at a raised position.

3) The single unit blow mold is slid to be inserted into the predetermined space within the clamping boards 204 to be temporarily positioned.

4) The clamping boards 204 are set to a closed state.

5) The fixing jig is removed, and the blow mold unit 10 is temporarily fixed to the clamping boards 204 with bolts or the like.

6) The centering jigs 400 are inserted into at least the opening portions 410A at both ends of the blow mold (refer to FIG. 5). At this time, the first centering portions 402 of the centering jigs 400 are accommodated inside the opening portions 410A with almost no gap therebetween.

7) The blow nozzles 500 are caused to descend to fit to the centering jigs 400. At this time, the second centering portions 403 of the centering jigs 400 are accommodated between the inner nozzle 501 and the outer nozzle 502 with almost no gap therebetween. Specifically, the blow mold which is unitized with the centering jigs 400 is pushed and moved in association with the descending and fitting of the blow nozzles 500, and the blow mold is positioned based on the central positions of the blow nozzles 500. In this way, the centering jigs 400 are fitted to both the blow mold and the blow nozzles 500. As a result, via the centering jigs 400, adjustment is performed so that the central positions of the opening portions 410A of the blow mold and the central positions of the blow nozzles 500 coincide with each other (adjusted to be centered).

8) The blow mold is fixed finally to the clamping boards 204 with the bolts or the like in a state where the blow mold is adjusted to be centered.

9) The blow nozzles 500 are caused to ascend, and the clamping mechanism is set to an open state.

It is preferable to execute the positional adjustment using the centering jigs 400 described above before preforms are blow molded.

By fixing the blow mold completely to the clamping boards 204 with the bolts or the like with the blow mold and the blow nozzles positioned relative to each other using the centering jigs 400, the blow mold can be fixed to the clamping boards 204 with good accuracy and quickly.

2. Closing and Clamping Operations of Blow Mold Unit

Figure 7:
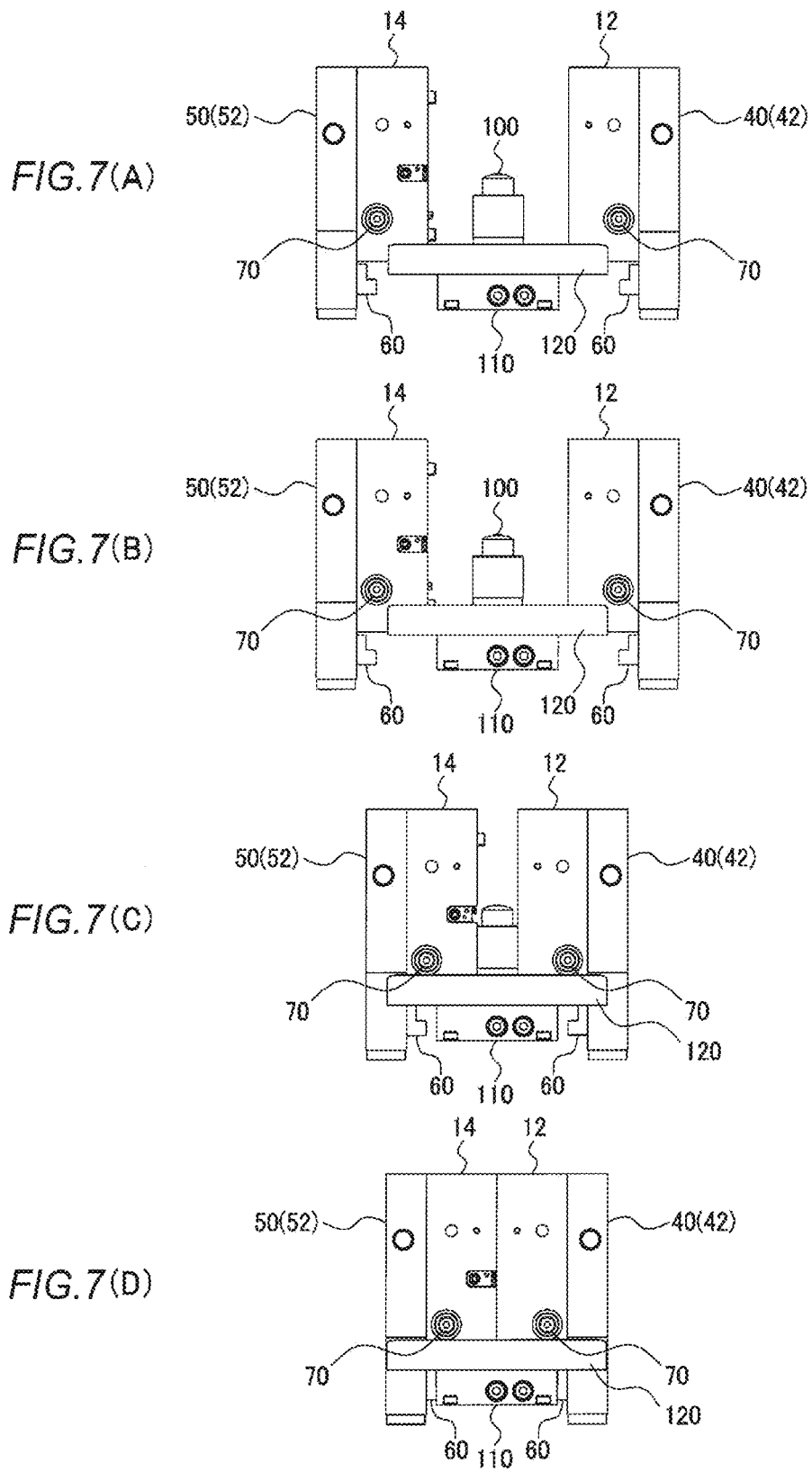
FIGS. 7(A), 7(B), 7(C) and 7(D) are views showing closing and clamping operations of the blow mold.

Next, referring to FIG. 1, FIGS. 7(A) to 7(D) and FIGS. 8 to 9, closing and clamping operations of the blow mold unit 10 will be described. FIG. 7(A) shows a state in which the blow mold unit 10 is opened. The first and second blow cavity split molds 12, 14 are fully opened, and the bottom molds 100 are set to the lower limit position. At this time, preforms (not shown) are transferred into the blow mold unit 10 by a transfer jig, and a closing operation of the blow mold unit 10 is started after the preforms have been transferred.

FIGS. 1 and 7(B) show a state after the bottom molds 100 are closed. A closing operation of the bottom molds 100 is realized as a result of the bottom mold opening/closing unit 210 being raised by the clamping mechanism of the blow molding machine 200. The bottom mold opening/closing unit 210 can set the bottom mold fixing plate 110 and the bottom molds 100 which are fixed thereto to the closed position which is the upper limit position via the first spacer member 300.

Figure 8:
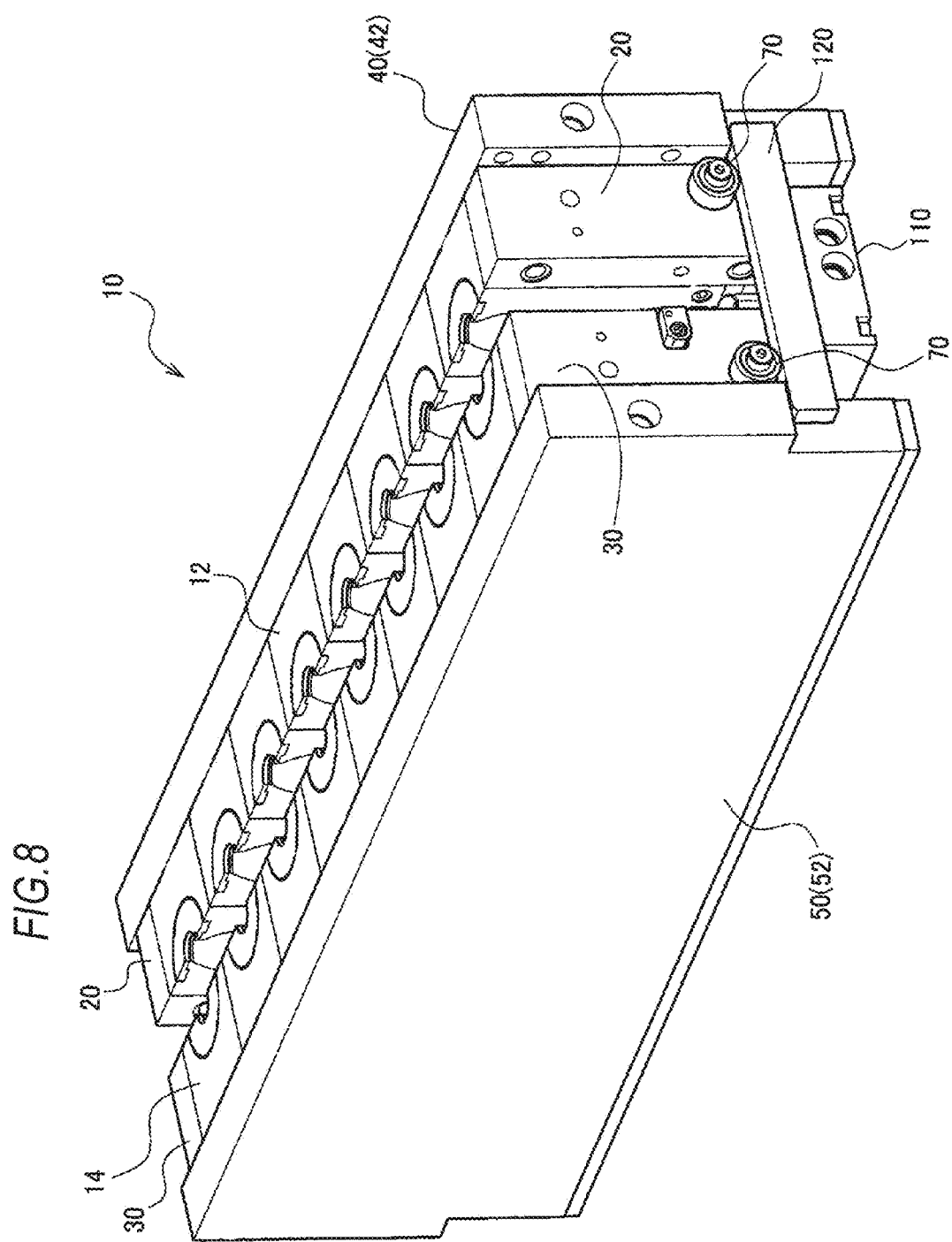
FIG. 8 is a view showing a halfway state of a closing operation of the first and second blow cavity split molds shown in FIG. 1.

FIGS. 7(C) and 8 show, for example, a state in which the first and second blow cavity split molds 12, 14 are being closed halfway after the bottom molds 100 have been set to the closed position. The first and second blow cavity split molds 12, 14 may be started to be moved for closing before the bottom molds 100 arrive at the closed position. However, at the latest, the bottom molds 100 need to be arrived at the closed position immediately before the pressure receiving members 60, which move together with the first and second blow cavity split molds 12, 14, are brought into engagement with the grooves 112 of the bottom mold fixing plate 110.

Here, in case there is a deviation in the closed position of the bottom molds 100 set by the bottom mold opening/closing unit 210, the guide rollers 70 are brought into rolling contact with the guide plates 120. At this time, the height position or inclination of the bottom molds 100 is corrected by the pressure exerted by the guide rollers 70 against the moving and biasing force exerted by the air cylinder 250 in the direction D3A. This enables the pressure receiving members 60 which are provided to the fixing plates 40, 50 to which the first and second blow cavity split molds 12, 14 are fixed to be reliably brought into engagement with the grooves 112 on the bottom mold fixing plate 110. Additionally, the positional relationship (clearance) between the bottom molds 100 and the first and second blow cavity split molds 12, 14 can be reliably regulated, whereby it is possible to prevent a breakage due to contacts of the molds by the deviation in position thereof. Further, since the moving conditions or positional relationship of the bottom molds 100 can be visualized from a side of the blow mold unit 10 at an opening/closing operation of the molds, the blow molding can be performed safer.

At this time, since the guide rollers 70 are not the stopper members like those disclosed in Patent Document 1, as long as the closed position of the bottom molds 100 is normal, the guide rollers 70 can be made not to be brought into contact with the guide plates 120. Even though the guide rollers 70 are brought into contact with the guide plates 120, the guide rollers 70 roll on the guide plates 120 so as to reduce the frictional force, and the guide plates 120 are allowed to move together with the bottom molds 100 by the air cylinder 250. Thus, no excessive stress is applied to the guide rollers 70 and the guide plates 120, and therefore, it is possible to prevent the occurrence of galling therein or wear thereof with time.

Figure 9:
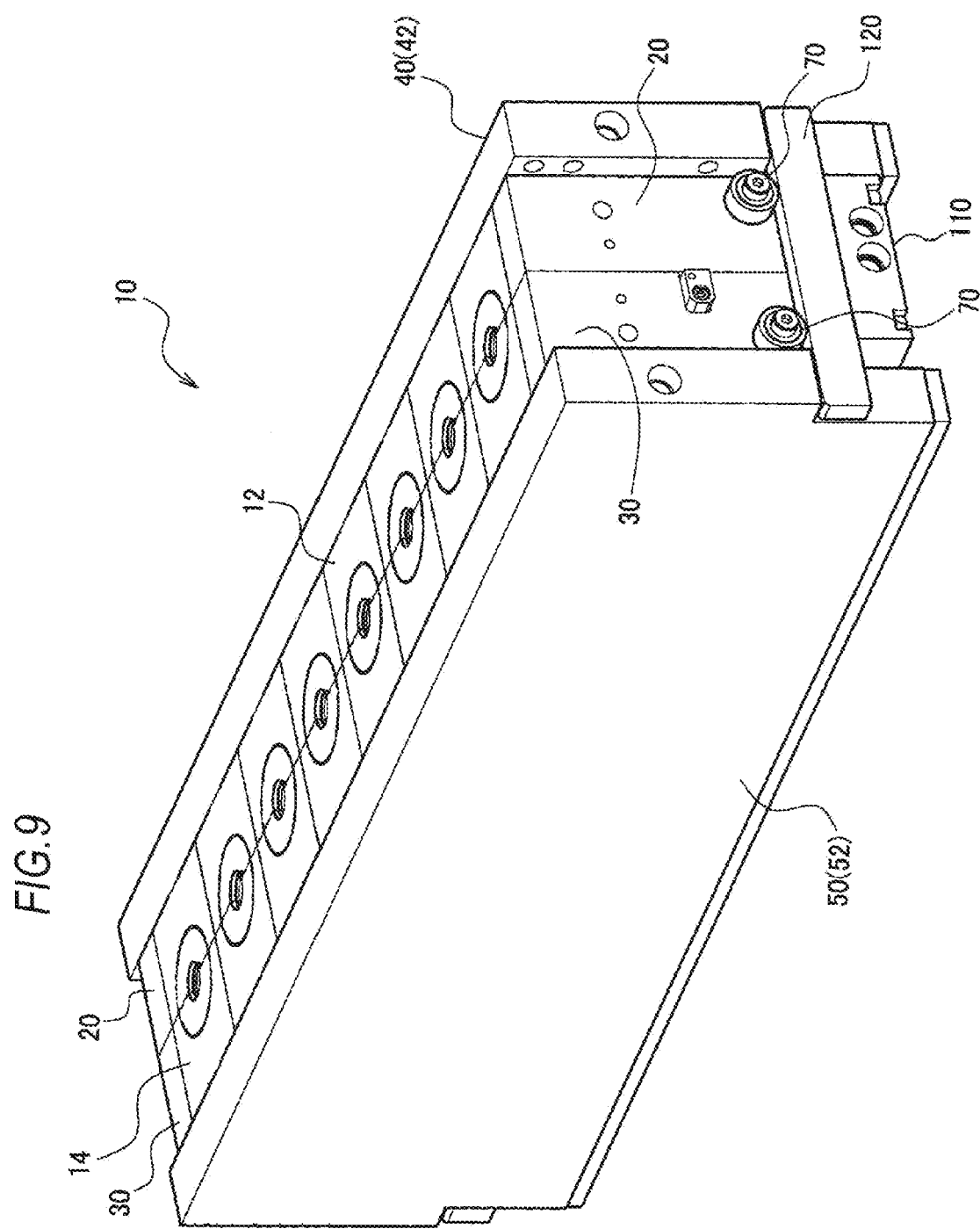
FIG. 9 is a view showing a state in which the first and second blow cavity split molds are clamped together.

FIGS. 7(D) and 9 show a state in which the first and second blow cavity split molds 12, 14 and the bottom molds 100 are clamped together. At this time, the parting surfaces 12A, 14A (refer to FIG. 1) of the first and second blow cavity split molds 12, 14 are brought into contact with each other, and the first and second pressure receiving plates 20, 30 are brought into abutment with each other to thereby receive the blowing pressure exerted on the first and second blow cavity split molds 12, 14. Additionally, since the pressure receiving members 60 are brought into engagement with the grooves 112 of the bottom mold fixing plate 110, the blowing pressure exerted on the bottom molds 100 can also be received.

Thereafter, blow air is introduced into the preforms, and the extending rods are driven downwards along their vertical axes, whereby the preforms are blow molded in a biaxially oriented fashion in the cavities 16 to thereby mold containers.

After the blow molding is completed, the molds are opened in an opposite order to the order in which the molds are closed, and the molded containers can be removed from the blow mold unit 10.

While the embodiment of the invention has been described in detail, those skilled in the art to which the invention pertains can easily understand that many modifications can be made thereto without substantially departing from the novel matters and advantages of the invention. Therefore, these modified examples are all included in the scope of the invention. For example, a term which is described together with a different term having a broader or the synonymous meaning at least once in the specification or the drawings can be replaced with the different term in any other portions in the specification or the drawings.

This patent application is based on the Japanese Patent Application No. 2012-181033 filed on Aug. 17, 2012, the contents of which are incorporated herein by reference.

DESCRIPTION OF REFERENCE NUMERALS AND CHARACTERS

10: blow mold unit
12: first blow cavity split mold
12A, 14A: parting face
14: second blow cavity split mold
16: cavity
20: first pressure receiving plate
30: second receiving plate
40: first fixing plate
42, 52: inner fixing plate
44, 54: outer fixing plate;
50: second fixing plate
60: pressure receiving member
70: guided member (guide roller)
80: first guide roller
90: movement guide member
100: bottom mold
110: bottom mold fixing plate
112: groove
114: first connecting portion
116: second connecting portion
120: guide plate
122: end face
124: side face
126: chambered portion
200: blow molding machine
204: clamping board
204A: second guide roller
210: bottom mold opening/closing unit
250: moving and biasing member (air cylinder)
D1: first direction
D2: second direction

The invention claimed is:
1. A blow mold unit comprising:
first and second blow cavity split molds to be clamped together by bringing their parting faces into abutment with each other;
a plurality of bottom molds defining a plurality of bottom shapes for a plurality of cavities which are defined by the first and second blow cavity split molds;

first pressure receiving plates respectively fixed to both side faces of the first blow cavity split mold, which are located at both ends in a first direction along a direction in which the plurality of cavities are aligned;

second pressure receiving plates respectively fixed to both side faces of the second blow cavity split mold and brought into abutment with the first pressure receiving plates when the first and second blow cavity split molds are clamped together;

a first fixing plate to which the first blow cavity split mold and the first pressure receiving plates are fixed;

a second fixing plate to which the second blow mold and the second pressure receiving plates are fixed;

a bottom mold fixing plate to which the plurality of bottom molds are fixed;

pressure receiving members respectively fixed to the first and second fixing plates and brought into engagement with the bottom mold fixing plate when the first and second blow cavity split molds are clamped together to receive a blowing pressure exerted on the bottom molds;

guide plates respectively fixed to the bottom mold fixing plate at both end portions in the first direction; and guided members respectively supported by the first and second pressure receiving plates at both end portions in the first direction and capable of being brought into abutment with the guide plates when the bottom molds are in a closed position, wherein a length of the guide plate in a second direction along a direction in which the first and second blow cavity split molds are opened and closed is formed in a length by which the guided members face the guide plates at least immediately before the pressure receiving members are brought into engagement with the bottom mold fixing plate.

2. The blow mold unit according to claim 1,
wherein, in the guide plate, corner portions, which are formed by an end face capable of being brought into abutment with the guided members and side faces intersecting the end face at the end portion at both end sides in the second direction, are chamfered.

3. The blow mold unit according to claim 1,
wherein the first and second fixing plates respectively include:
an inner fixing plate to which either of the first and second blow cavity split molds, and the pressure receiving member are fixed;
an outer fixing plate to which the inner fixing plate is fixed and which is to be attached to a clamping board of a blow molding machine; and
a first guide roller supported by the outer fixing plate to be brought into rolling contact with the inner fixing plate and guiding a movement of the inner fixing plate in the first direction before the inner fixing plate is fixed to the outer fixing plate.

4. The blow mold unit according to claim 3,
wherein the blow mold unit further comprises, between the outer fixing plate which is fixed to the first blow cavity split mold and the outer fixing plate which is fixed to the second blow cavity split mold, a movement guide member which guides movement of the first and second blow cavity split molds in the second direction along the direction in which the first and second blow cavity split molds are opened and closed.

5. A blow mold unit fixing method, wherein the blow mold unit comprises, first and second blow cavity split molds to be clamped together by bringing their parting faces into abutment with each other;
a plurality of bottom molds defining a plurality of bottom shapes for a plurality of cavities which are defined by the first and second blow cavity split molds;
first pressure receiving plates respectively fixed to both side faces of the first blow cavity split mold, which are located at both ends in a first direction along a direction in which the plurality of cavities are aligned;
second pressure receiving plates respectively fixed to both side faces of the second blow cavity split mold and brought into abutment with the first pressure receiving plates when the first and second blow cavity split molds are clamped together;
a first fixing plate to which the first blow cavity split mold and the first pressure receiving plates are fixed;
a second fixing plate to which the second blow mold and the second pressure receiving plates are fixed;
a bottom mold fixing plate to which the plurality of bottom molds are fixed;
pressure receiving members respectively fixed to the first and second fixing plates and brought into engagement with the bottom mold fixing plate when the first and second blow cavity split molds are clamped together to receive a blowing pressure exerted on the bottom molds;
guide plates respectively fixed to the bottom mold fixing plate at both end portions in the first direction; and
guided members respectively supported by the first and second pressure receiving plates at both end portions in the first direction and capable of being brought into abutment with the guide plates when the bottom molds are in a closed position,
wherein a length of the guide plate in a second direction along a direction in which the first and second blow cavity split molds are opened and closed is formed in a length by which the guided members face the guide plates at least immediately before the pressure receiving members are brought into engagement with the bottom mold fixing plate, and
the blow mold unit fixing method comprising the steps of:
preparing a centering jig including a first centering portion which can be fitted in an opening portion of the cavity formed in the blow mold unit and a second centering portion which can be fitted in a gap formed around a circumference of an extending rod of a blow nozzle;
positioning the blow mold unit and the blow nozzle by using the centering jig; and
fixing the blow mold unit which is positioned by using the centering jig to a clamping board of a clamping mechanism of a blow molding machine.

\* \* \* \* \*